United States Patent [19]

Fukunaga

[11] Patent Number: 5,016,398
[45] Date of Patent: May 21, 1991

[54] WIRE STRIPPING APPARATUS

[76] Inventor: Akio Fukunaga, 4623 Sunnyhill Street, Westlake Village, Calif. 91362

[21] Appl. No.: 362,088

[22] Filed: Jun. 6, 1989

[51] Int. Cl.⁵ .............................................. B24B 7/00
[52] U.S. Cl. .................... 51/80 R; 51/82 R; 51/170 PT
[58] Field of Search .................. 51/289 R, 80 R, 82 R, 51/170 PT, 170 MT, 80 A, 87 R, 23, 90, DIG. 10, 331, 334; 81/9.51

[56] References Cited

U.S. PATENT DOCUMENTS

| | | |
|---|---|---|
| 2,008,276 | 7/1935 | Giersten et al. . |
| 3,385,140 | 5/1968 | Carpenter et al. . |
| 3,887,702 | 5/1959 | Freitag . |
| 3,906,676 | 9/1975 | Orlando, Sr. .................. 51/289 R |
| 4,459,881 | 7/1984 | Hughes, Jr. . |
| 4,490,908 | 1/1985 | Tengler . |
| 4,594,029 | 6/1986 | Michael, III . |
| 4,729,268 | 3/1988 | Morrow . |
| 4,730,391 | 3/1988 | Wood . |

OTHER PUBLICATIONS

Garrett Industrial Supply Company—Catalog 50 Cover page and p. 175.
Olbrich Electronic Group—Catalog Cover page and pp. 160-161.
Marshall Claude Michael—Catalog pp. iv, 315-316.

Primary Examiner—Maurina Rachuba
Attorney, Agent, or Firm—Henry M. Bissell

[57] ABSTRACT

A housing encloses a pair of stripping wheel assemblies adustably mounted for rotation about a central axis on a rotatable frame which is driven by a motor. Each stripping wheel assembly includes an abrasive or stripping wheel positioned to abrade the surface of a wire inserted along the central axis. In one arrangement each stripping wheel assembly comprises a pair of bearing blocks which mount the stripping wheel to be driven via a pair of spur gears. The drive gear is affixed to a drive roller which is driven by rolling contact with the transverse inner surface of the end of the housing. In another arrangement, the stripping wheels are mounted on the same shafts as their respective drive gears which are rotated by engagement with a series of pins mounted in a circle and contacted in succession by the drive gears as the assemblies revolve about the central axis. The stripping wheel assemblies are adjustable radially inward or outward to accommodate different wire sizes. An alternative embodiment has a hollow central shaft mounting a pulley which is coupled to be driven an offset motor. This latter arrangement includes actuators for retracting and extending the stripping assemblies at appropriate points so that wire may be continuously fed through the device while the stripping of selected portions thereof is accomplished in a step-and-repeat operation.

37 Claims, 2 Drawing Sheets

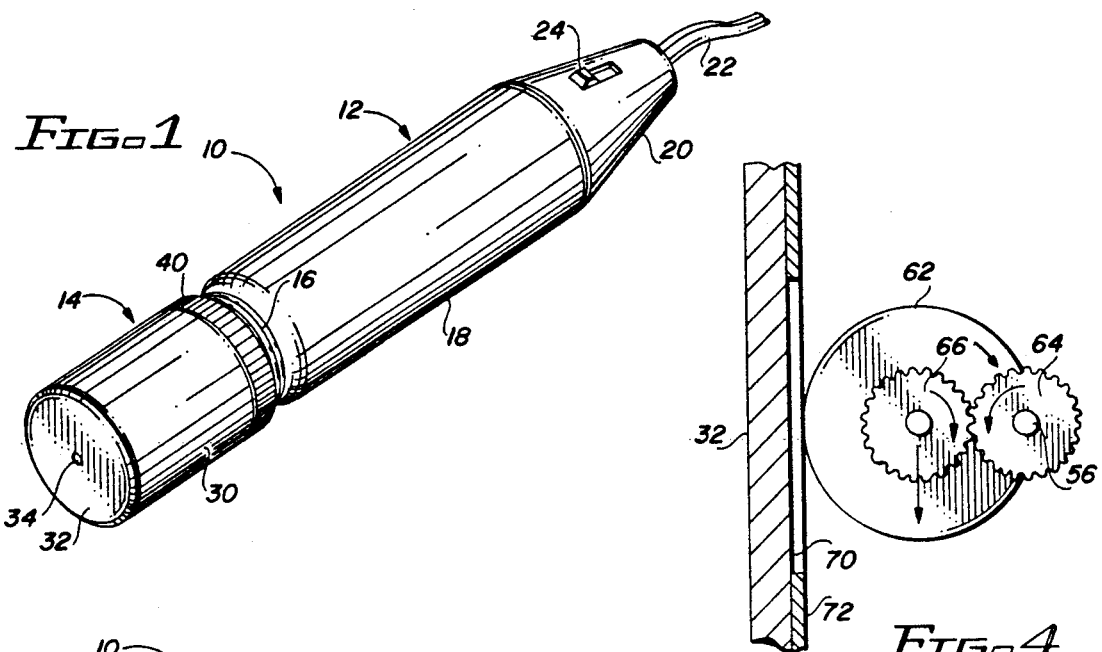
FIG-1
FIG-4
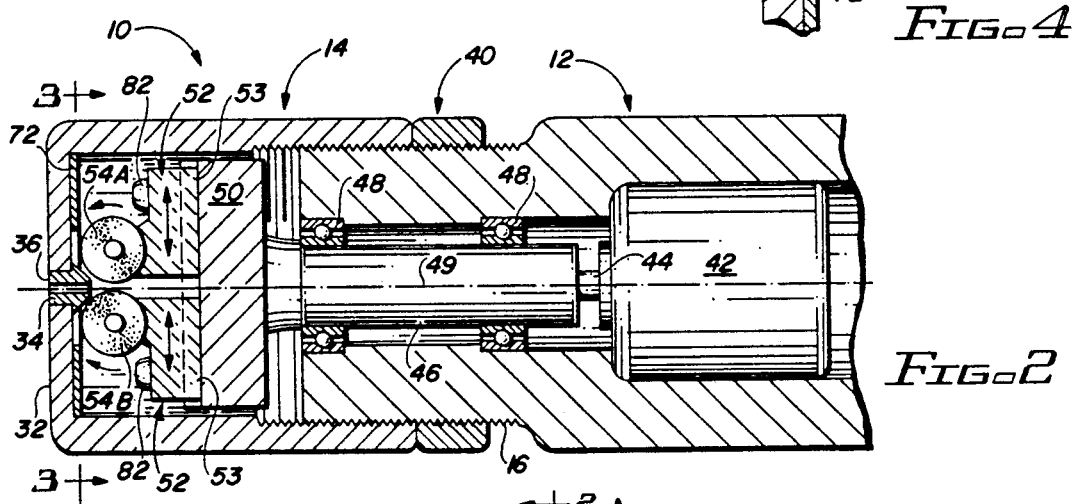
FIG-2
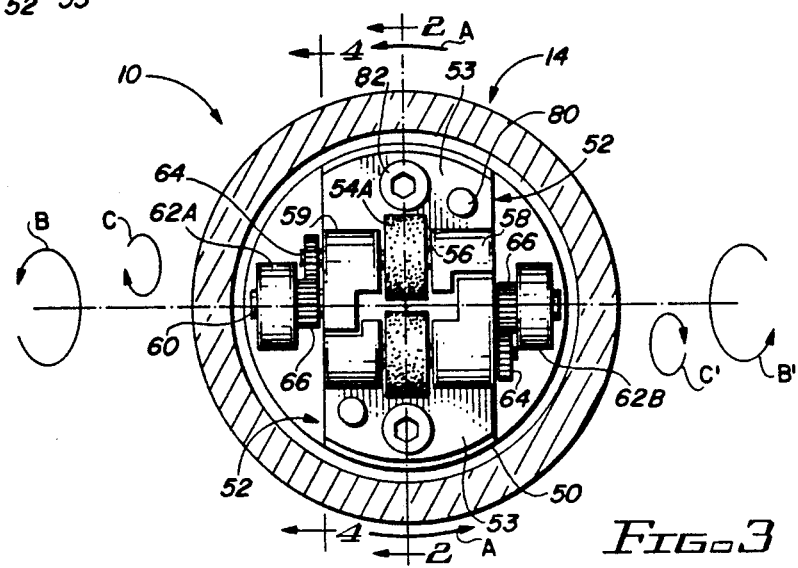
FIG-3

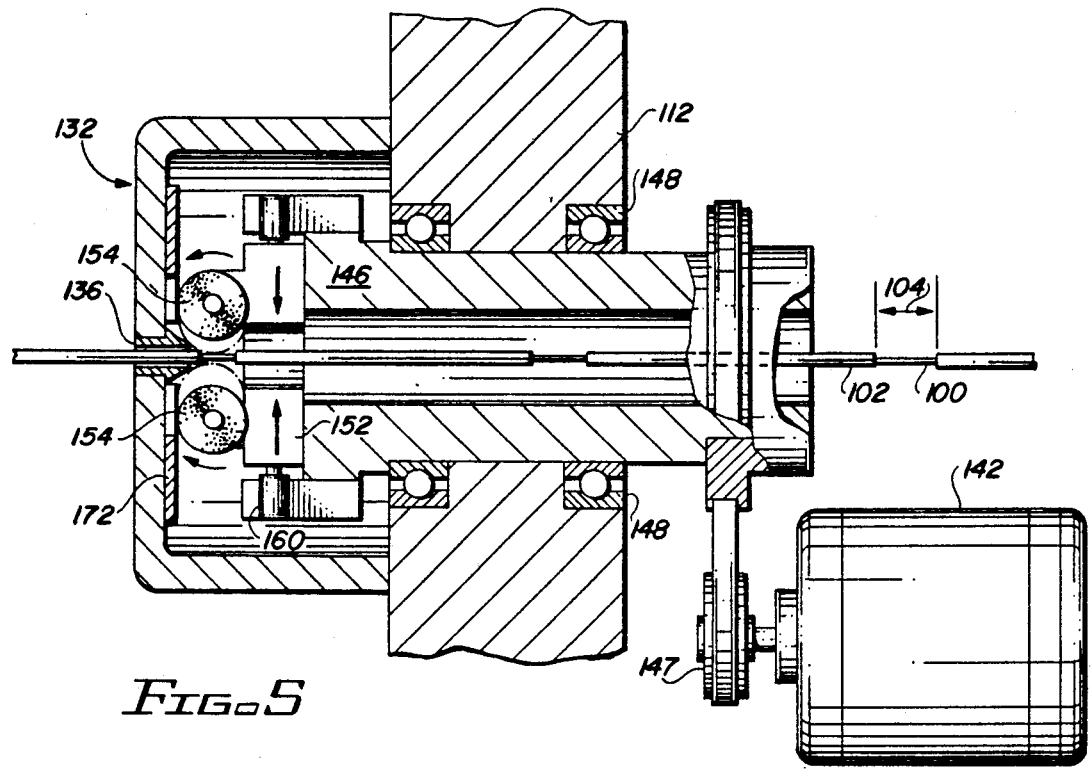
FIG. 5
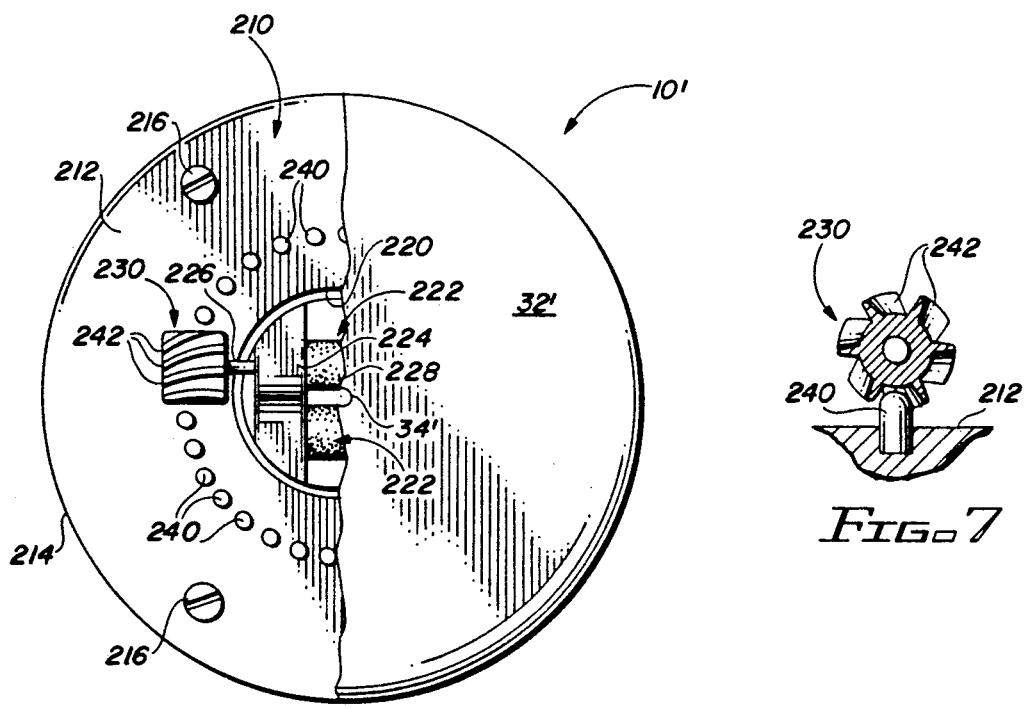
FIG. 6
FIG. 7

WIRE STRIPPING APPARATUS

BACKGROUND OF THE INVENTION

1. Field of the Invention

This invention relates to wire stripping apparatus and, more particularly, to such apparatus utilizing rotating abrasive wheels for removing insulating coating from electrical conductor wire.

2. Description of the Related Art.

Magnet wire, transformer wire, etc. is commonly coated with a varnish insulation. This must be removed at the ends of the wire to permit solderable interconnections. Some of these wires are extremely fine, as small as about 0.003 inches in diameter. Removal of the insulation is sometimes difficult with known wire stripping apparatus. The wire may be dipped in a chemical etchant, but that is unacceptable in many instances because of the potentially corrosive residue which may remain on the wire.

Insulating coatings other than varnish may comprise materials of enamel, plastic, nylon, woven glass, Teflon, P.V.C., neoprene, rubber, polyamide and the like. Stationary strippers for such insulation are known which have a wire guide into which the wire may be inserted for stripping contact between the two oppositely rotating abrading wheels. Similar devices are used which have rotating brushes, rather than abrading wheels, to accomplish the stripping of insulation.

However, in those devices which are known, the pivot axes of the abrading wheels or brushes are fixed so that the wire is only stripped along two surfaces 180 degrees apart. The wire must be manually rotated in devices of this type in order to be able to strip the insulation all the way around the wire. This is sometimes difficult to accomplish without damaging the wire, particularly where the wire is extremely fine or ductile.

The Giertsen et al U.S. Pat. No. 2,008,276 discloses a telephone plug cleaning machine with a bore for receiving a telephone plug along a central axis. The contacting surfaces of the telephone messaging plug are cleaned by engaging the plug with the peripheral or effective surfaces of two sets of closely spaced abrasives-bearing rubber disks which are moved in a planetary movement through the operation of a supportable rotatable frame connected to a motor and a gearing mechanism. The direction of application of the abrading action is transverse to the axis of the plug. Such apparatus is unsuitable for stripping insulation from wires of the type to which the present invention is directed.

Freitag in U.S. Pat. No. 2,887,702 discloses a wire cleaning apparatus utilizing rotatable wire brushes. The apparatus includes a motor coupled through a gear train to a pair of brushes which are manually adjustable to vary the spacing between the brushes. A guard housing surrounds the brushes and includes an opening which serves as a guide for wire to be positioned between the cleaning brushes.

The Carpenter et al U.S. Pat. No. 3,385,140 relates to apparatus stripping insulation from multi-conductor cable having conductors disposed in side-by-side relation and in a common plane. Such cable is sometimes referred to as ribbon cable. A pair of fiberglass insulation stripping wheels are mounted in positions to admit the flat cable between them. The wheels are driven so that adjacent peripheral elements of the wheels move in opposite directions to oppose the stripping forces exerted upon the opposite sides of the cable as it is inserted between the wheels for insulation stripping.

What is needed is a small, hand-held wire stripping device for use in conjunction with production line operations. The device should be able to strip extremely fine and/or ductile wires about the entire circumference of the wire end quickly and easily in one simple operation without damaging the wire.

SUMMARY OF THE INVENTION

In brief, arrangements in accordance with the present invention comprise a housing having a generally flat planar end with a central bore in which a wire entry guide is mounted. This guide is removable to permit replacement with guides of different sizes to accommodate different sizes of wire. Within the housing, coaxially aligned with the entrance bore, is a rotatable shaft mounted in support bearings. The shaft supports a pair of rotatably driven roller wheel assemblies in a juxtaposition such that the stripping wheels are positioned adjacent the wire guide and on opposite sides of the central axis. The radial position of the stripping wheels relative to the central axis of the housing is adjustable within a predetermined range to permit use of the device with different sizes of wire and insulation.

One particular arrangement in accordance with the invention incorporates a drive roller mounted in each corresponding assembly to rotate the associated stripping wheel on its axis as the assembly is rotated about the central axis. In each stripping wheel assembly, the drive roller and stripping wheel are mounted for rotation on shaft axes which are parallel to but displaced from each other. These shaft axes are orthogonal to the direction of the central axis. The two shafts carry spur gears which intermesh so that rotation of the drive roller causes the stripping wheel to rotate. The drive roller shafts of the two assemblies are mounted so as to be in line with each other along a diameter of the housing. The drive rollers are mounted near the outboard ends of the assemblies adjacent the inner surface of the cylindrical bore of the housing.

The inner face of the end of the housing is generally flat and planar across the end of the hollow cylindrical bore and forms a cup-shaped end portion of the housing which is threadably connected to the main portion of the housing. The cup-shaped end portion can be readily removed to permit adjustment of the radial position of the stripping wheels, cleaning of the stripping wheels, removal of debris and dust from the wire insulation, and the like. A flat annular ring member, somewhat like a washer, is mounted to the end wall inner face. This may be fabricated of rubber or some like frictional surface material, in which case it is affixed to the end wall inner surface by a suitable adhesive. In such a case, the drive rollers may be of metal, possibly with a machined peripheral surface adapted to develop better frictional engagement with the annular member. Alternatively, the flat annular member may be machined as a portion of the inner face of the housing end portion, in which case the drive rollers should be of rubber or a similar resilient frictional material or of metal having an outer surface layer of rubber or similar resilient material.

The arrangement just described serves to produce rotation of the abrasive stripping wheels in opposite directions when driven by the drive rollers. The entire unit within the housing, comprising the drive shaft, associated support frame and the two drive roller/stripping wheel assemblies, rotates with the drive shaft.

When this occurs, the drive rollers are driven to rotate through the frictional engagement with the flat annular end track, thus driving the stripping wheels to rotate through the intercoupled gearing arrangements. At the same time, the stripping wheels revolve about the axis of the housing along which the wire being stripped extends. Thus, the abrading or stripping action occurs about all sides of the wire so that the insulation is removed evenly throughout the complete circumference of the wire. Since the wire does not have to be rotated manually to expose the insulation on all sides to the abrading wheels, a more even, delicate stripping operation is achieved, and the wire is less likely to be damaged by the stripping device, particularly where extremely fine wires are involved.

In another particular arrangement in accordance with the present invention, the drive mechanism for the stripping wheel of the respective stripping wheel assemblies comprises a directly driven gearing arrangement instead of the frictional drive rollers of the first-mentioned arrangement. Near the front end or face of the wire stripping apparatus of this arrangement, mounted within the cylindrical housing, is a pin gear plate having a central bore through which the rotatable shaft supporting the two stripping wheel assemblies extends. In this arrangement, each stripping wheel is directly driven by a gear mounted on the stripping wheel shaft. The gearing arrangement is similar to a rack and pinion gear, except that the rack portion extends in a circle, rather than being straight, and comprises a plurality of pins having rounded ends extending from the pin gear plate in place of gear teeth. The "pinion" gear has a plurality of teeth especially formed to accommodate intermeshing and sliding engagement with the individual pins as the stripping wheel assemblies revolve about the central axis, the stripping wheels being driven by their respective coaxial pinion gears which are rotated by engagement with the pins of the pin gear plate. The action of the stripping wheels in removing insulation from wires inserted between the stripping wheels along the central bore of the apparatus is the same as that described hereinabove for the first arrangement. It has been found, however, that this arrangement operates with substantially less friction, and therefore requires less driving power, than is encountered in the first-mentioned arrangement.

In one embodiment of the present invention, the unit is a small, hand-held device with a self-contained electric motor coupled to rotatably drive the central shaft. A finger switch in the housing wall permits the operator to control power to the motor, either from a self-contained power pack or from local AC mains.

In another embodiment of the present invention, the unit is designed to be bench-mounted and its central shaft is coupled to an external pulley which may be driven by an associated electric motor. The central drive shaft is hollow, having a bore which extends out the rear end of the device, through the drive pulley. The drive roller/stripping wheel assemblies are mounted to the shaft by means of actuators which extend and retract the stripping wheels from operative positions adjacent the central axis. This enables the device to remove insulation from selected portions of the wire as it is fed through the unit. After stripping in this manner, the wire is fed to a cutting machine to be cut at the stripped portions so that individual lengths of wire having stripped ends are provided. With this arrangement, the wire may be fed and stripped rapidly at selected portions in a type of step-and-repeat operation with the stripping being effected at one portion about the circumference of the wire, after which the actuators retract the stripping wheels radially outwardly, the wire is fed through the device (in through the wire guide and out through the hollow bore of the shaft at the rear end thereof) by a predetermined distance according to the desired length of the stripped wire, and the actuators extend the stripping wheels radially inward to effect the stripping at the next portion of the wire.

Either of the two arrangements described hereinabove may be incorporated in the respective embodiments of the present invention as described herein.

BRIEF DESCRIPTION OF THE DRAWING

A better understanding of the present invention may be realized from a consideration of the following detailed description, taken in conjunction with the drawings, in which:

FIG. 1 is a perspective view of a hand-held wire stripping device in accordance with one particular arrangement in accordance with the present invention;

FIG. 2 is a side sectional view of a portion of the device of FIG. 1;

FIG. 3 is an end view, in section, of the device of FIG. 1;

FIG. 4 is another side sectional view of a portion of the device of FIG. 1;

FIG. 5 is a partial side sectional view of an alternative embodiment of the present invention;

FIG. 6 is a schematic end view, partially broken away, of a second particular arrangement in accordance with the present invention; and FIG. 7 is a schematic view showing the details of a portion of the arrangement of FIG. 6.

DESCRIPTION OF THE PREFERRED EMBODIMENTS

FIG. 1 shows a perspective view of a first preferred embodiment of the present invention. In FIG. 1, a hand-held unit 10 is shown comprising a main housing portion 12 and an end housing portion 14 threadably connected via a threaded section 16. The main housing portion 12 includes a generally cylindrical hand grip 18 tapering at a cone-shaped portion 20 to a distal end to which an electrical lead 22 is attached. A finger switch 24 is connected in the circuit to a motor within the portion 18.

The end portion 14 comprises a hollow bore housing section 30 terminating in a flat, planar, transverse end wall 32, in the center of which is an opening 34 containing a wire guide for admitting a wire to be stripped by the unit 10. FIGS. 2, 3 and 4 show details of the internal apparatus of the unit 10 of FIG. 1. As particularly shown in FIG. 2, a wire guide 36 is installed within the opening 34 in the end wall 32. Different wire guides 36 of different sizes may be installed to accommodate particular sizes of wire that are to be stripped. The cup-shaped end portion 14 is locked in place on threads 16 of the main housing 12 by means of a locknut 40. A motor 42 is shown within the main housing portion 12, having a shaft 44, 46 which is mounted in ball bearings 48 about the central axis 49 of the implement 10. Shaft 46 supports a rotatable frame 50 on which are mounted a pair of stripping assemblies 52. Each stripping assembly 52 includes a bracket 53 which supports a stripping wheel 54 mounted on a shaft 56 (see FIG. 3) in bearing blocks 58, 59. Bearing block 59 supports an additional shaft 60 on which a drive roller 62 is installed. The shafts 56 and 60 mount enmeshed spur gears 64, 66 in a drive arrangement which enables the rotation of the drive roller 62 to produce rotation of the associated stripping wheel 54.

The arrangement for causing rotation of the drive roller 62, and thus the gear train 64, 66 and shaft 56 of the stripping wheel 54 is shown in FIG. 4 which is a partial sectional view taken along the line 4—4 of FIG. 3, looking in the direction of the arrows. As is shown in FIGS. 2 and 4, the inner surface 70 of the end wall 32 is provided with an annular member 72. This serves as a frictional track or raceway for the drive roller 62 as the latter revolves about the central axis of the unit 10. In the particular embodiment shown, the drive roller 62 is a metal wheel and the track 72 is in the form of an annular washer-like member of a resilient material such as plastic or rubber. As an alternative, the drive roller 62 may be formed of a resilient material or have a "tire" or outer layer of resilient material, in which case the annular member 72 can be dispensed with and the drive roller could merely bear against the inner surface 70 of the end wall 32.

The operation of the device 10 can perhaps be best understood by reference to the view of FIG. 3. Rotation of the mounting frame 50, bearing the assemblies 52, in a counterclockwise direction as indicated by the arrows A within the end housing portion 14 produces a counterclockwise rotation of the left drive roller 62A as indicated by the arrow B, when viewed from the left-hand side of FIG. 3. Considering this motion in FIG. 4, the roller 62A moves downwardly, relative to the track 72, with rotation of the roller 62A shown in a clockwise direction (because it is viewed from the opposite end of its shaft 60).

As a result of the rotation of the drive roller 62A in the counterclockwise direction, according to arrow B (FIG. 3), the stripping wheel 54A is rotated in the clockwise direction as indicated by arrow C (viewed from the left side of the figure). This translates in FIG. 2 to a counterclockwise direction of the upper stripping wheel 54A, when viewed from the opposite end of the shaft. The peripheral surface movement of the upper wheel 54A is away from the wire guide 36, thus always tending to draw the wire into the device 10. The direction of peripheral movement of the lower wheel 54B is in the same direction--away from the wire guide 36; thus both stripping wheels 54 tend to draw the wire being stripped into the device when it is operating. As viewed in FIG. 2, the lower stripping wheel 54B rotates in a clockwise direction, corresponding to the arrow C' (FIG. 3) as driven by the gear train and associated drive roller 62B, the direction of which when viewed from the right-hand side of FIG. 3 is indicated by arrow B'.

As indicated by the vertical arrows in FIG. 2, the assemblies 52 can be adjusted in a radial direction on the rotatable frame 50 in order to accommodate different sizes of wire being stripped. Each of the assemblies 52 includes a bracket adjusting pin 80 and a bracket set screw 82 to control the radial position of the assembly 52.

A second preferred embodiment of the present invention is schematically represented in FIG. 5 which shows a stationary frame 112 mounting a plurality of bearings 148 which rotatably support a hollow shaft 146. Frame 112 is adapted for mounting on a bench or the like in association with a separate drive motor 142. The motor 142 and shaft 146 are equipped with drive pulleys 147, 149 or equivalent sprockets so that the shaft 146 may be rotated by the motor 142 via suitable drive belts, gear belts or the like.

The mechanisms for supporting and driving the stripping wheels 154 are essentially like those shown and described in connection with FIGS. 2-4. Each stripping wheel 154 is coupled to, and is driven by, a suitable gear train and drive roller arrangement (not shown), the drive roller being forced to rotate in driving relationship as it moves along a raceway member 172 on the inner surface of the end wall 132.

Each of the support assemblies 152 is mounted for radial displacement in a corresponding actuator 160 which is installed on the rotating shaft 146. The actuators 160 are controlled by electrical signals coupled into the rotating assembly of the device 100 by means of conventional current-conducting rings and brushes or wiper contacts, not shown. The apparatus of FIG. 5 is designed to be used in conjunction with a wire cutting machine (not shown) which operates in a step-and-repeat mode to draw wire 100 past a cutting knife by a predetermined length, stop the wire movement while the knife is activated to cut the wire, and then advance it again by the next length to be cut. The embodiment of FIG. 5 is operated in conjunction with this step-and-repeat procedure so that when movement of the wire 100 is stopped, the actuators 160 are controlled to move the assemblies 152 radially inward so that stripping of the insulation 102 can occur. Relative movement of the wire 100 by a limited amount while the wire at the cutting station is held stationary will be controlled so that the desired stripping dimension 104 is realized. This dimension 104 conventionally is twice the desired length of the stripped ends of the cut wires, since the wire 100 will be cut in the middle of the bare section.

FIGS. 6 and 7 are schematic representations of a variation in the drive mechanism for the wire stripping assemblies of the present invention. FIG. 6 schematically represents an end view of a wire stripping implement 10', having an end wall 32' in the form of a cover plate mounting a central opening 34' which contains a wire guide for admitting wire to be stripped by the unit 10'. The cover plate 32' is shown broken away along a vertical axis to illustrate the driving arrangement on the left half of FIG. 6.

On the left side of FIG. 6 is shown a transversely mounted pin plate 210 which may be in the form of a disk 212 mounted to the housing 214 by means of mounting screws 216. The disk 212 has a central opening 220 through which the respective stripping wheel assemblies 222 extend, mounted on suitable bearings (not shown) for rotation about the central axis of the implement 10' which is aligned with the wire guide 34'. Each of the wire stripping assemblies 222 comprises a mounting frame 224 having bearings (not shown) supporting a shaft 226 on which a stripping wheel 228 and a drive gear 230 are mounted so that the drive gear 230 may rotatably drive the stripping wheel 228 to develop the stripping action of a wire inserted through the wire guide 34'.

The pin plate 210 has a plurality of pins 240 mounted in a circle thereon, preferably inserted in transverse holes drilled in the plate 210. One such pin 240 is shown in the schematic diagram of FIG. 7, illustrating the way in which it engages gear teeth of the drive gear 230 and causes the gear 230 to rotate on the axis of its shaft 226 as the wire stripping assembly 222 is rotatably driven to revolve about the central axis. The gear 230 is provided with a plurality of teeth 242, better shown in FIG. 7, which are especially curved so as to engage successive pins 240 as the gear 230 traverses the pin circle in the plate 210. It will be appreciated that the teeth 242 of the gear 230 must accommodate relative sliding movement of the pin 240 along the operative face of the engaged gear tooth 242, since a pin 240 enters the space between two adjacent teeth 242 near the radially inward end thereof, moves radially outward relative to the gear 230 and then moves radially inward again as it approaches the exit point. The gear teeth 242 are especially shaped so that the point of surface contact of the tooth is parallel to the point of surface contact of the contacting pin 240. This drive arrangements develops very little friction, as compared with the arrangement described in conjunction with FIGS. 2–5, and can be driven with less power. The effect of the wire stripping wheels 228 is the same as that described for the wire stripping wheels 54 of the other arrangement. Radial adjustment of the wire stripping assemblies is permitted in order to accommodate different sizes of wire to be stripped. The drive arrangement of FIGS. 6–7 can be used in place of the particular arrangement of FIGS. 2–4 in the embodiment depicted in FIG. 5.

As shown and described above in conjunction with the accompanying drawings, arrangements in accordance with the present invention advantageously provide for improvements in the efficiency and effectiveness of wire stripping apparatus. In accordance with one embodiment of the invention, a particularly small, compact, hand-held wire stripper is provided which can be used as a portable tool for stripping wires in making circuit repairs at the site of electrical equipment, or it may be used at a work station on a production line. In any case, the operation of apparatus in accordance with the invention results in a complete, even removal of wire insulation all around the wire without the operator having to twist the wire as it is being stripped. The stripping of the insulation is accomplished by means of drawing forces only which are exerted on the wire, thus making it feasible to use the device with extremely fine, ductile wires down to as small as 0.003 inches in diameter. A second embodiment of the invention achieves similar beneficial results by using the equivalent wire stripping mechanism in a manner which permits drawing the wire entirely through the apparatus, thereby adapting the invention for use in conjunction with conventional step-and-repeat wire cutting machines.

Although there have been shown and described hereinabove specific arrangements of a wire stripping apparatus in accordance with the invention for the purpose of illustrating the manner in which the invention may be used to advantage, it will be appreciated that the invention is not limited thereto. Accordingly, any and all modifications, variations, or equivalent arrangements which may occur to those skilled in the art should be considered to be within the scope of the invention as defined in the annexed claims.

What is claimed is:

1. Wire stripping apparatus comprising:
a frame member supported for rotation about a central axis;
a generally cylindrical housing at least partially enclosing said frame member and having wall means extending transversely along one end of the housing, said wall means having means defining an opening in line with said central axis for receiving wire to be abraded for the stripping of unwanted material therefrom;
a pair of opposed assemblies mounted on the frame member for rotation therewith, each assembly including an abrading wheel mounted for rotation about an axis orthogonal to said central axis and displaced therefrom in order to abrade an adjacent surface of a wire received through said opening by relative movement of the peripheral surface of said wheel against said wire in a direction parallel to said central axis when said wheel is rotated about its axis; and
means in each assembly for driving the abrading wheel thereof to rotate about its axis as said assembly revolves with said frame about said central axis.

2. The apparatus of claim 1 wherein said driving means include means coupled to the abrading wheel and frictionally engaging an inner surface of said wall means as said assembly revolves about said central axis.

3. The apparatus of claim 1 wherein said driving means comprise a drive roller bearing against said wall means and coupled in rotational driving relationship to said abrading wheel.

4. The apparatus of claim 2 wherein said driving means comprise a drive roller mounted for rotation about a shaft displaced from a shaft supporting the abrading wheel, and a gear train coupling the drive roller shaft and the abrading wheel shaft in driving relationship.

5. The apparatus of claim 4 wherein said gear train comprises a pair of meshed spur gears mounted respectively to the drive roller shaft and the abrading wheel shaft.

6. The apparatus of claim 2 wherein the inner surface or the end wall includes a circular raceway adjacent the outer periphery of said wall means and adapted to frictionally engage the drive rollers of said assemblies.

7. The apparatus of claim 6 wherein said raceway comprises an annular disk-shaped member positioned along the inner surface or the wall means for frictionally engaging the drive rollers.

8. The apparatus of claim 7 wherein said annular member is formed of a resilient frictional material and the drive rollers are of metal.

9. The apparatus of claim 6 wherein said drive rollers are formed with an outer peripheral surface of resilient frictional material.

10. The apparatus of claim 6 wherein said drive rollers are of resilient frictional material.

11. The apparatus of claim 2 wherein the abrading wheels revolve completely about said central axis as the wheels rotate on their respective axes to abrade a wire extending along said central axis completely about the circumference of the wire.

12. The apparatus of claim 11 wherein the direction of rotation of both abrading wheels about their respective axes is such as to apply tension to a wire entering the opening in the end wall in order to draw the wire into the housing as the external surface of the wire is being abraded.

13. The apparatus of claim 2 further including a wire guide removably mounted in said wall means opening and having a guide opening selected to match the size of the wire to be abraded.

14. The apparatus of claim 2 wherein said wall means opening defining means include means for releasably receiving a wire guide selected from a set of different wire guides which correspond to different sizes and types of wire to be abraded.

15. The apparatus of claim 2 wherein said housing includes a cup-shaped end portion, a main housing portion, and means for threadably coupling the two portions together in a releasable connection.

16. The apparatus of claim 15 further including a threaded locking member for locking the two housing portions in a fixed juxtaposition when the two portions are threadably connected together.

17. The apparatus of claim 2 further including a motor and a central motor shaft positioned within said housing and coupled to rotatably drive said frame member.

18. The apparatus of claim 17 wherein said main housing portion comprises a tapered distal end remote from a cup-shaped portion and means for mounting a finger switch which is in circuit with said motor and an electrical power cord to control power to the motor.

19. The apparatus of claim 2 further including means for rotatably driving said frame member from an external motive source, and wherein said housing includes an exit end opening remote from said wall means opening for permitting wire to be fed out of said apparatus after it has been abraded.

20. The apparatus of claim 19 wherein said frame member driving means comprise a first pulley coupled to drive said frame member, said pulley having a hollow central bore in alignment with said central axis for permitting wire to pass therethrough.

21. The apparatus of claim 20 further including an external motor having a second pulley and a belt connected between said pulleys for driving the frame member and wire stripping assemblies.

22. The apparatus of claim 2 wherein said assemblies are radially adjustable relative to the frame member, and further including means for adjusting the position of said assemblies on said frame member relative to said central axis.

23. The apparatus of claim 22 wherein said adjusting means comprise a bracket adjusting pin and a bracket set screw attaching the assemblies to the frame member.

24. The apparatus of claim 5 wherein each assembly further comprises a pair of blocks positioned on opposite sides of the abrading wheel for rotatably mounting the abrading wheel and its shaft, one of said blocks further including a portion offset from the abrading wheel shaft for rotatably mounting the drive roller and its shaft.

25. The apparatus of claim 24 wherein said assemblies are symmetrically shaped and positioned to support the abrading wheels on opposite sides of the central axis and the drive rollers along a common axis orthogonal to and extending through said central axis.

26. The apparatus of claim 1 wherein said driving means include means coupled to the abrading wheel and mounted for positive engagement with said wall means to develop rotation of said coupled means as said assembly revolves about said central axis.

27. The apparatus of claim 26 wherein said driving means further include a plurality of regularly spaced projections protruding from said wall means and a drive gear mounted on a shaft with an associated abrading wheel and in engagement with said projections.

28. The apparatus of claim 27 wherein said wall means comprise an annular disk and said projections comprise a plurality of pins mounted therein in a circle surrounding said central axis.

29. The apparatus of claim 1 wherein said driving means include a plurality of drive elements mounted in a circle which is oriented generally orthogonally to said central axis and concentric therewith and a gear mounted on a shaft with an associated abrading wheel in a position to be rotated by said drive elements as said assembly revolves about said central axis.

30. The apparatus of claim 29 wherein said drive elements comprise a plurality of drive pins inserted in mounting holes in a transversely mounted pin plate.

31. The apparatus of claim 30 wherein said gear includes a plurality of teeth which are especially shaped to accommodate relative sliding movement between the gear teeth and the drive pins as the gear moves about the circle of the pins.

32. The apparatus of claim 31 wherein the gear teeth are shaped to develop parallelism between the contact surface of the gear and the contact surface of the contacting pin at all points or contact between a tooth and pin.

33. The apparatus of claim 26 further including a wire guide removably mounted in said wall means opening and having a guide opening selected to match the size of the wire to be abraded.

34. The apparatus of claim 26 further including a motor and a central motor shaft positioned within said housing and coupled to rotatably drive said frame member.

35. The apparatus of claim 26 further including means for rotatably driving said frame member from an external motive source, and wherein said housing includes an exit end opening remote from said end wall opening for permitting wire to be fed out of said apparatus after it has been abraded.

36. The apparatus of claim 35 wherein said frame member driving means comprise a first pulley coupled to drive said frame member, said pulley having a hollow central bore in alignment with said central axis for permitting wire to pass therethrough.

37. The apparatus of claim 36 further including an external motor having a second pulley and a belt connected between said pulleys for driving the frame member and wire stripping assemblies.

* * * * *